Nov. 25, 1941.   H. F. PATTERSON ET AL   2,264,004
FLUID SEAL
Filed July 28, 1939   2 Sheets-Sheet 1

INVENTORS.
Herbert F. Patterson
BY Roy T. Bucy.
Harness, Dind, Patee & Harris
ATTORNEYS.

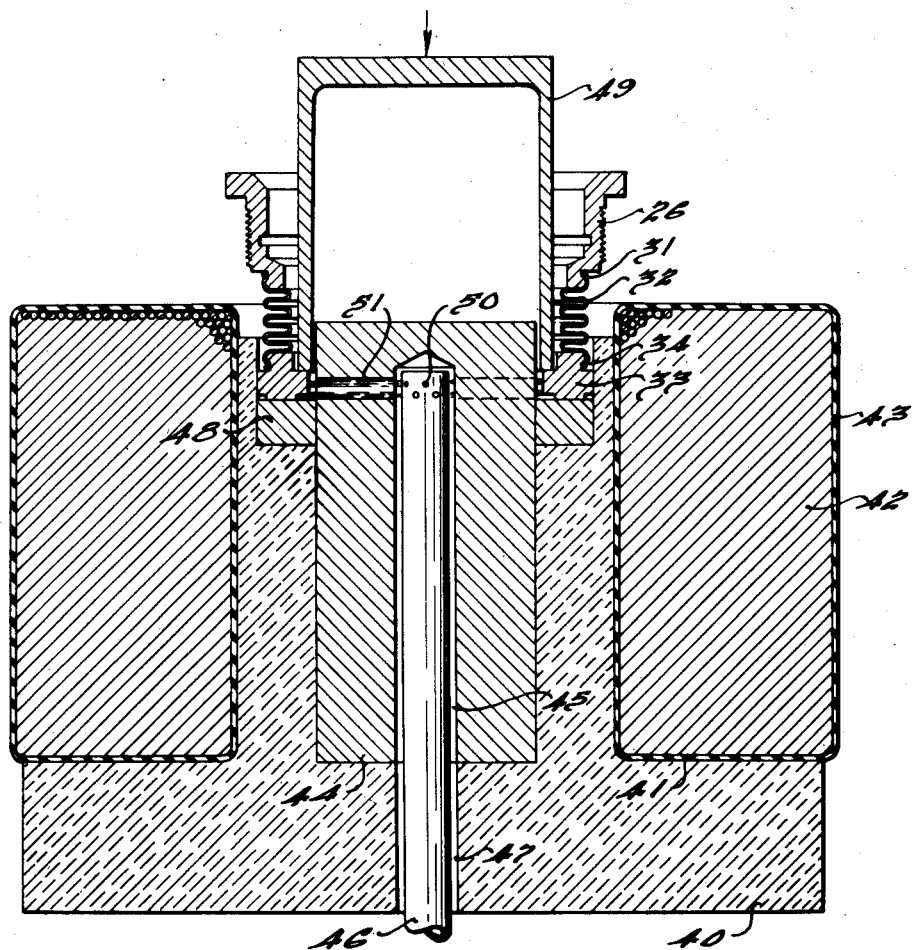

Patented Nov. 25, 1941

2,264,004

UNITED STATES PATENT OFFICE 2,264,004

FLUID SEAL

Herbert F. Patterson, St. Clair Shores, and Roy T. Bucy, Detroit, Mich., assignors to Chrysler Corporation, Highland Park, Mich., a corporation of Delaware Application July 28, 1939, Serial No. 287,038

3 Claims. (Cl. 148—4)

This invention relates to the joining of metals and particularly to a process and apparatus for manufacturing fluid seals of the type which comprises a flexible bellows attached to a hardened wear ring.

The principal object of the invention is to provide a process and apparatus for quickly and economically joining the flexible bellows to the wear ring while simultaneously imparting a hardening heat treatment to the wear ring.

A further object of the invention is to provide a simple inductive heat treating apparatus which does not require the use of high frequency current.

Other objects and advantages of the invention will be apparent from the following description, reference being had to the accompanying drawings, wherein a preferred form of the invention is illustrated.

In the drawings:

Fig. 3 is a more-or-less diagrammatic showing of a heat treating furnace for carrying out the present invention.

Figure 1:
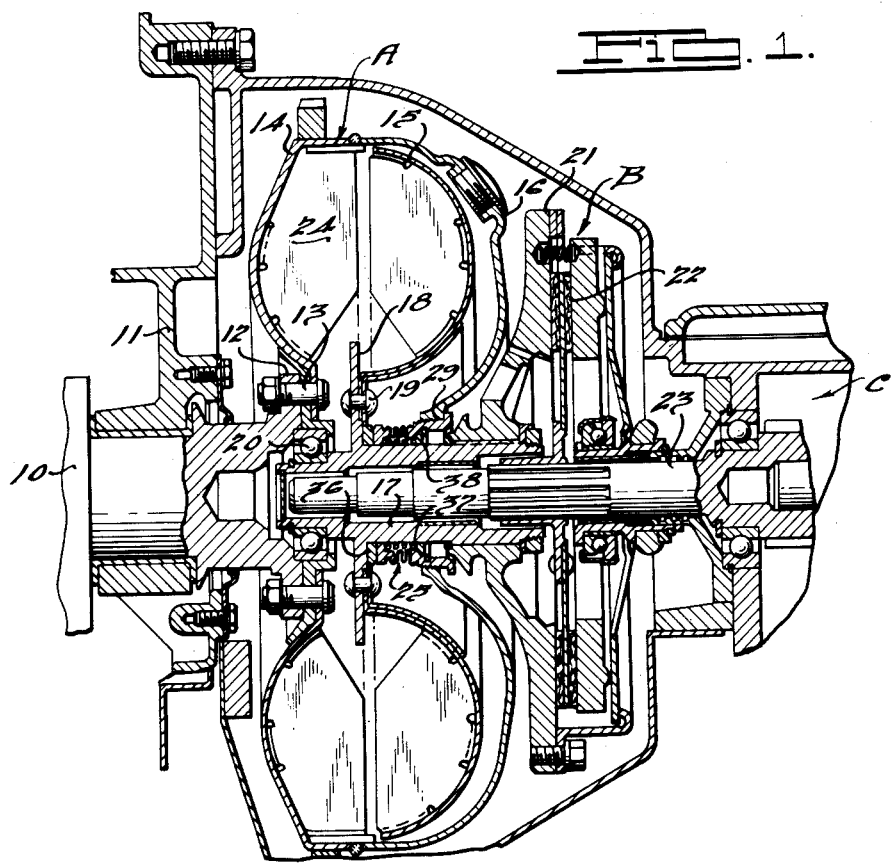
Fig. 1 is a longitudinal vertical section through a fluid coupling and clutch assembly.

In Fig. 1, 10 designates the engine crankshaft of a motor vehicle which is suitably supported in a housing 11 and has a flanged end 12 fastened by bolts 13 to the impeller 14 of a fluid coupling generally designated by the letter A. The coupling A is of the well known kinetic type and comprises a runner 15 carried for rotation relative to the impeller by a hollow shaft 17, the runner being secured to the flange 18 of said shaft by rivets 19.

Hollow shaft 17 is supported at its forward end in the crankshaft 10 by an anti-friction thrust bearing 20 and carries the driving element 21 of a friction clutch B at its rear end. The clutch B may be of any suitable type and is provided with a driving disc 22 for driving the intermediate shaft 23. The latter is piloted in hollow shaft 17 as illustrated and extends rearwardly of the vehicle into the housing of the transmission mechanism C. Inasmuch as the details of the clutch B form no part of the present invention they will not be further described.

The impeller 14 is provided with a rear casing portion 16 which completely encloses the runner 15. The interior of the coupling is normally filled with oil or other fluid to about 80 percent of its capacity and this fluid is circulated by the vanes 24 through the various fluid circulating passages of the impeller and runner thereby driving the runner in the manner well known to the art.

Due to the fact that the speeds of the impeller and runner vary because of the inherent "slip" therebetween a fluid-tight seal must be provided between the housing 16 and the shaft 17. This seal is generally designated at 25 in Fig. 1 and is shown in enlarged form in Fig. 2. It comprises a collar 26, threaded at 27 for engagement with mating threads formed in housing 16 at 29. The collar 26 has a reduced portion 30 to which is attached by solder 31 a flexible bellows 32. The latter is preferably of the well known "sylphon" type, but other types may be used if desired.

Attached to the other end of the bellows by solder 34 is a contact or wear ring 33. This contact ring has a ground flat surface 35 which abuts a similar flat surface formed on a second wear ring or collar 36 (Fig. 1). The ring 33 is preferably of steel and the surface 35 thereof is hardened to resist wear. The ring 36 may be of hardened steel, but is preferably of sintered material which may be oil impregnated if desired. A coil spring 37 (Fig. 1) bears against the inner flanged surface of the ring 33 and against a thrust washer 38 and functions to force the ring 33 against the ring 36 with sufficient pressure to prevent leakage of fluid.

During period of vehicle acceleration and at other times when the speeds of the impeller and runner vary considerably, the temperature of the fluid rises and under conditions of extreme slip may reach 400–500° F. The pressure of the trapped air rises correspondingly. It is therefore necessary for the seal 25 to be of such construction that it will resist high temperatures and provide a fluid-tight seal under high pressure conditions. It has been found desirable to employ silver solder at 31 and 34, this type of solder having been found to withstand temperatures around 800° F. without losing its mechanical strength.

Figure 2:
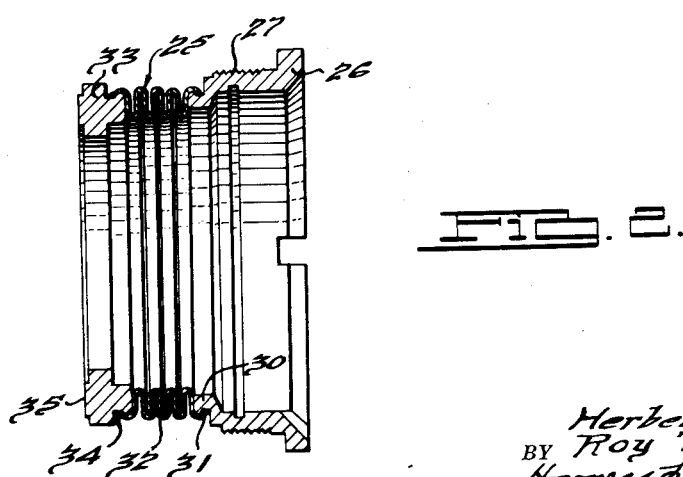
Fig. 2 is a sectional view on an enlarged scale of the fluid seal used between the runner and the impeller casing of the Fig. 1 coupling.

Because of the high temperature (above 800° F.) necessary for fusing the silver solder at the points 31 and 34, the fabrication of the seal assembly illustrated in Fig. 2 cannot be carried out by ordinary methods. The use of a soldering iron or a gas or oil fired furnace results in excessive heating of the bellows (which is preferably of bronze or similar ductile material) with consequent impairment of the flexibility and strength thereof. In addition, annealing of the ring 33 must be avoided, especially at the surface 35 which must be glass hard to resist wear.

By use of the apparatus illustrated in Fig. 3 and the method about to be described, the joints 31 and 34 may be quickly and conveniently soldered without damage to the bellows 32 and at the same time, the ring 33 may be hardened thus eliminating the preliminary heat treatment thereof.

Referring to Fig. 3, an inductive heating furnace is shown which comprises a base 40 of suitable refractory material. The base has an annular ledge 41 on which is seated a coil 42 having a suitable insulating wrapping 43. The base is also provided with a recessed portion in which is seated a core 44 of iron having a bore 45. A pipe 46 extends upwardly through the base 45 and an aligned bore 47 provided in the base 40 and conveys quenching fluid as will be presently explained. The core 44 is of such size and shape that the lines of flux from the coil 42 are concentrated in a path passing through the ring 33 in order to eliminate heating of the bellows to as great an extent as possible.

A metal hearth 48 surrounds the core and is adapted to support the seal assembly, the ring 33 resting on the hearth. The hearth may be of steel, but is preferably of nickel or some other metal which will not distort upon quenching. A clamp member 49 rests on the inner flanged surface of the ring 33 and retains the seal in position.

The furnace shown in Fig. 3 is adapted to fuse the joint 34 only and harden the ring 33. A similar furnace may be employed to fuse the joint 31 or if desired, a furnace like that of Fig. 3, but having a deeper recess for reception of the seal assembly may be employed.

In carrying out our improved process with the apparatus of Fig. 3, the ring 33 is assembled in correct relation with respect to the bellows 32, the joint 31 between the bellows and the collar 26 having previously been soldered, and a layer of silver solder is placed at the joint 34. The assembly is then placed in the furnace as shown in Fig. 3 and the coil 42 energized. Current of comparatively low frequency may be used, frequencies of 180–360 cycles having been found satisfactory. However, the frequency to be employed varies with the relative wall thicknesses of the bellows and ring. In cases where an extremely thin walled bellows is being joined to a wear ring, higher frequencies (up to 3000 cycles) must be employed, so that the ring may be brought up to temperature more rapidly thus avoiding undue heating of the bellows.

The current is allowed to remain on just long enough to melt the solder at 34 and heat the ring 33 sufficiently, then the circuit is opened and a jet of quenching fluid is forced through the tube 46 which is provided at the top thereof with holes 50. The fluid, which may be water, oil, or other suitable quenching fluid, is forced through the passages 51 provided in the core 44 and into contact with the ring 33 thereby quickly cooling the ring and solidifying the solder.

Due to the fact that the bellows 32 is made of non-ferrous material, it is heated only slightly and then principally by conduction from the ferrous ring 33 during the above described operation, thus the strength or flexibility thereof is not impaired, because the heating takes place rapidly and the ring 33 is cooled by quenching before there has been sufficient time to cause appreciable heating of the bellows.

The above described method is quick and efficient and may be carried out with simple apparatus. The refractory material of the base member 40 tends to thermally insulate the ring 33 and prevent loss of heat during the induction period as well as protect the coil 42 from damage by heat. The metal hearth 48 is heated during the induction period and helps maintain the surface 35 of the ring 33 at maximum temperature until quenching.

Having thus described a preferred embodiment of our invention, it is desired to point out that it is not intended to limit the same in its broader sense except as set forth in the claims appended hereto which define the scope of the invention.

We claim:

1. The process of joining a non-ferrous metal to a ferrous metal and simultaneously hardening the ferrous metal which comprises placing the metals in proper relative position together with suitable metallic bonding material, heating the ferrous metal and bonding material by induction and quenching to harden the ferrous metal and solidify the bonding material.

2. The process of joining a ferrous wear ring to a non-ferrous bellows under such conditions that the strength and ductility of the bellows will not be impaired which comprises placing the ring and bellows in proper relative position together with suitable metallic bonding material, heating the bonding material to fusion temperature by electric induction, then quenching the bonding material to harden the same and prevent conduction of heat to the bellows.

3. In the manufacture of a fluid seal which includes a ferrous wear ring and a non-ferrous bellows, the process of joining said wear ring to said bellows and simultaneously hardening said ring under such conditions that the strength and ductility of the bellows will be unimpaired which comprises placing the ring and bellows in proper relative position together with suitable metallic bonding material, subjecting the assembly to the action of an alternately magnetic field for a time sufficient to raise the ring to tempering temperature and fuse the bond, then quenching to harden the ring and solidify the bond.

HERBERT F. PATTERSON.
ROY T. BUCY.